United States Patent [19]

Gillet et al.

[11] Patent Number: 5,240,646
[45] Date of Patent: Aug. 31, 1993

[54] ELECTROCHROMIC MATERIALS

[75] Inventors: Pierre-Alain Gillet, Besancon; Jean-Louis Fourquet, Le Mans; Odile Bohnke, Besancon, all of France

[73] Assignee: Centre National de la Recherche Scientifique, Paris, France

[21] Appl. No.: 712,680

[22] Filed: Jun. 10, 1991

[30] Foreign Application Priority Data

Jun. 11, 1990 [FR] France .................................. 90 07227

[51] Int. Cl.$^5$ ........................ H01B 1/08; C01G 23/04
[52] U.S. Cl. ..................................... 252/518; 252/520; 252/583; 252/584; 252/600; 359/265; 423/70; 423/608
[58] Field of Search ............... 252/520, 583, 584, 600, 252/518; 359/265; 423/608, 70

[56] References Cited

U.S. PATENT DOCUMENTS

| | | | |
|---|---|---|---|
| 3,033,907 | 5/1962 | Rue | 252/520 |
| 3,578,843 | 5/1971 | Castellion | 252/600 |
| 4,225,216 | 9/1980 | Boyd et al. | 252/518 |
| 4,448,493 | 5/1984 | Matsudaira et al. | 252/62.2 |
| 4,465,339 | 8/1984 | Bauck et al. | 252/600 |
| 4,933,109 | 6/1990 | Yamada et al. | 252/520 |

OTHER PUBLICATIONS

Yeong Il et al., *J. Am. Chem. Soc.* 113(25), pp. 9561-9563, 1991.
Feist et al., *NATO ASI Ser.*, Ser B 172 pp. 481-484, 1987.
Feist et al., *Solid State Ionics*, vol. 28 ∝ 30 (part 2), pp. 1338-1343, 1987.
Gopalakriskan, *Rev. Solid State Sci.*, 1(3-4), pp. 515-527, 1988.
Bhat et al., *J. Solid State Chem.* 63(2), 278-83, 1986.
Izawa et al., *J. Solid State Chem.* 69(2), 336-42, 1987.
Izawa et al., *Funtai Ordoi Funmatsu Yakin*, 33(7), 353-5, 1986.
Chemical Abstracts, vol. 107, No. 18, 1987, No. 167598.
Chemical Abstracts, vol. 109, No. 12, 1988.

Primary Examiner—Paul Lieberman
Assistant Examiner—Bradley A. Swope
Attorney, Agent, or Firm—Cesari and McKenna

[57] ABSTRACT

The invention relates to novel electrochromic materials useful as electrochromic electrodes in eletrochromic cells and to their preparation process. These materials are constituted by at least one transition metal oxyhydroxide chosen from among $H_2Ti_3O_7$ and $HNbWO_6$, $H_2O$ or by a thin film obtained by vacuum evaporation of at least one of these oxyhydroxides.

7 Claims, 6 Drawing Sheets

ELECTROCHROMIC MATERIALS

The present invention relates to novel electrochromic materials and to their preparation process.

An electrochromic material is a material whose absorption spectrum can vary in the wavelength range corresponding to visible light, in a persistent and reversible manner under the action of an electrical current or a field.

These materials have numerous applications, particularly in electrooptical displays and modulatable optical density screens, e.g. modulatable, variable tint glazings.

Electrochromic phenomena are subdivided into two categories as a function of whether they are of an electronic nature (E.C.) or an electrochemical nature (E.C.C.).

Phenomena of an electronic nature (E.C.) can correspond to the formation of colored radicals, to a charge transfer between impurities, to the Franz-Keldysh effect (displacement of the edge of absorption bands) or to the Stark effect (variation of the dipole moment).

The phenomena of an electrochemical nature (E.C.C.) can correspond to redox reactions, to a coloring produced by a pH variation, to an electrolytic deposit, to a redox reaction coupled with a chemical reaction, or to an electrochemical reaction within a transition metal oxide.

More specifically, the present invention relates to electrochromic materials based on oxyhydroxides of transition metals, in which the electrochromic phenomena are more of an electrochemical nature as in the case of transition metal oxides, but which have certain advantages compared with the known electrochromic materials based on oxides of transition metals such as $WO_3$.

Thus, although electrochromic materials based on $WO_3$ are of interest, they suffer from the disadvantage of having a cathodic coloring potential very close to that corresponding to the giving off of hydrogen, which is prejudicial to the satisfactory operation of an electrochromic cell having a proton electrolyte.

The present invention specifically relates to novel electrochromic materials obviating the above disadvantage.

According to the invention, these novel electrochromic materials are constituted by at least one transition metal oxyhydroxide chosen from among $H_2Ti_3O_7$ and $HNbWO_6$, $H_2O$.

These novel electrochromic materials can easily be prepared in crystalline product form by low temperature synthesis methods using a $H^+$/alkali metal ion exchange on solid products, with, in general, a slight evolution of the crystalline structure.

Thus, in the case of $H_2Ti_3O_7$, it is possible to carry out this synthesis starting with a lithium titanate $Li_2Ti_3O_7$, by $Li^+/H^+$ ion exchange using for said exchange an inorganic acid such as nitric acid.

In the case of $HNbWO_6$, $H_2O$, it is possible to start with an alkali metal niobotungstate such as $\alpha$-$LiNbWO_6$, which is subjected to $Li^+/H^+$ exchange by contacting with a sulphuric acid solution.

These reactions performed at low temperature, e.g. at a temperature of approximately 80° C., lead to crystalline products having electrochromic properties, but which are difficult to use in conventional electrochromic cells due to their powder character and lack of transparency.

According to the present invention, in order to overcome this disadvantage, from said crystalline powders are formed amorphous electrochromic material films using a simple vacuum evaporation or deposition process on an appropriate substrate.

The invention also relates to an electrochromic material layer obtained by the vacuum evaporation of at least one transition metal oxyhydroxide chosen from among $H_2Ti_3O_7$ $HNbWO_6$, $H_2O$.

The electrochromic material layers according to the invention can thus be formed either from a single oxyhydroxide, or from a mixture of two oxyhydroxides.

The layers formed from a mixture of two oxyhydroxides are of interest, particularly due to their coloring potential, which is less cathodic than that of $WO_3$.

The substrates used for the deposition of the layers can be transparent, reflective or conductive substrates, e.g. $SnO_2$ deposited on glass, mixed indium and tin oxide or stainless steel.

The invention is described in greater detail hereinafter relative to non-limitative embodiments and with reference to the attached drawings, wherein show.

EXAMPLE 1

Preparation of $HNbWO_6, H_2O$.

a) Preparation of $\alpha$-$LiNbWO_6$.

For this preparation, the starting product is the corresponding alkali metal compound, namely $\alpha$-$LiNbWO_6$, which is obtained by synthesis from $Li_2CO_3$, $Nb_2O_5$ and $WO_3$, which are commercially available products, mixing the latter in a molar ratio of 1.1:1:2.2 and subjecting the mixture to a heat treatment at 780° C. for 24 h.

The diffraction pattern of the powder obtained indicates a trirutile-type square lattice, whose parameters are:

$a = 4.6819$ (2) Å
$c = 9.2757$ (5) Å.

The presence of 001 lines with $1 = 2n + 1$ shows that the group is $P4_{21m}(Z=2)$. The space group indicates that the cations are positioned along the axis c.

b) Preparation of $HNbWO_6, H_2O$.

A $Li^+/H^+$ exchange is carried out on the thus obtained $\alpha$-$LiNbWO_6$ powder in 10N $H_2SO_4$ refluxed for several days and in this way is obtained the oxyhydroxide of formula $HNbWO_6, H_2O$.

The composition corresponding to this formula is confirmed by thermogravimetric analysis.

EXAMPLE 2

Preparation of $H_2Ti_3O_7$.

a) Preparation of $Li_2Ti_3O_7$.

The starting product for obtaining this compound is lithium titanate of formula $Li_2Ti_3O_7$ obtained by intimately grinding a mixture of $Li_2CO_3$ and $TiO_2$ in a molar ratio 1:3, pelletizing the mixture under a pressure of 300 MPa, heating the pellets to a temperature of 780° C. for 24 h for decomposing $Li_2CO_3$ into $Li_2O$ and $CO_2$, then regrinding the pellets, repelletizing them and heating them to 1050° C. in a muffle furnace for 3 days.

This gives lithium titanate $Li_2Ti_3O_7$ having a ramsdellite $\tau$-$MnO_2$-type structure, whose lattice is orthorhombic, the space group being Pnma, with the following lattice parameters:

$a = 9.5477$ (4) Å
$b = 2.9422$ (1) Å
$c = 5.0153$ (2) Å.

The structure of this material is constituted by regular octahedrons (Ti, Li)$O_6$ revealing tunnels in which are inserted lithium ions.

b) Preparation of $H_2Ti_3O_7$.

From $Li_2Ti_3O_7$ is prepared the oxyhydroxide $H_2Ti_3O_7$ by $Li^+/H^+$ exchange.

For this purpose, 3 g of $Li_2Ti_3O_7$ are treated by 150 ml of 5M nitric acid and the suspension is refluxed for 12 h. This gives a white powder rinsed with 500 ml of hot water and then dried. The lithium ions are dosed on the solid by flame emission spectrometry and it is observed that 97% of the initial lithium ions have been exchanged.

The powder X-ray diffraction spectrum is firstly indexed by isotypy with that of the parent phase $Li_2Ti_3O_7$. The lattice is orthorhombic, the space group is Pnma and the lattice parameters are:

$a = 9.7688$ (8) Å
$b = 2.9213$ (9) Å and
$c = 4.6745$ (5) Å.

Thus, the $Li^+/H^+$ exchange reaction on $Li_2Ti_3O_7$ is topotactic overall. The oxide ion lattice is preserved during the exchange. However, the octahedrons constituting the double chains come into deficit and the overall formula brought to the rutile type is $H_{0.5727}(Ti_{0.8575}\square_{0.1425})O_2$.

Thus, the material obtained is a transition metal oxyhydroxide and it has a crystalline structure able to accept supplementary cations. The oxyhydroxides obtained in Examples 1 and 2 are electrochromic materials.

For a use in displays or modulatable optical density screens, it is necessary for them to be in film form. This can be brought about by incorporating the oxyhydroxide powders into polymers such as polymethacrylate in order to form a film of thickness 50 to 100 μm or still better by directly forming, according to the invention, transparent electrochromic films from oxyhydroxides by vacuum evaporation and having thicknesses of 1000 to 3000 Å.

EXAMPLE 3

Preparation of a transparent film by evaporation of $HNbWO_6, H_2O$.

Vacuum evaporation takes place of the $HNbWO_6$, $H_2O$ powder obtained in Example 1 using a vacuum deposition apparatus.

400 mg of the $HNbWO_6$, $H_2O$ powder is placed in a Ta boat in the apparatus. This is followed by pumping until a pressure of $1.35.10^{-4}$ to $6.75.10^{-5}$ Pa is reached and heating takes place by the Joule effect in order to evaporate it. The vapor formed is then condensed on the surface of a transparent, glass substrate covered with $SnO_2$, in order to form a thin film there.

The substrate is carefully washed, rinsed and dried before being placed on a substrate holder 15 cm above the Ta boat containing the powder to be evaporated. The substrate holder is subjected to a rotary movement at a constant speed (10 r.p.m.).

The deposition rate is slow and typically 0.2 to 0.5 nm/s as a function of the temperature of the source. The power supplied during the heating of the boat is 500 W for the start of the evaporation and below 1 kW at the end of it.

This gives a transparent film. The optical properties of the colored film are different from those obtained as a result of the evaporation of $WO_3 + \frac{1}{2}Nb_2O_5$. Thus, the colored film obtained from $HNbWO_6$, $H_2O$ has a maximum absorption at $480 \pm 10$ nm, whereas the colored film obtained from $WO_3 + \frac{1}{2}Nb_2O_5$ has an absorption maximum at $390 \pm 20$ nm.

EXAMPLE 4

In this example testing takes place of the electrochromic properties of the layer or film obtained in Example 3 by vacuum evaporation of $HNbWO_6$, $H_2O$. For the purposes of this test, use is made of a cell having as the electrolyte 1M lithium perchlorate dissolved in propylene carbonate, a platinum counterelectrode, a reference electrode constituted by a silver wire in contact with a 0.01M silver perchlorate solution dissolved in propylene carbonate and an electrochromic electrode constituted by the substrate coated by vacuum evaporation of $HNbWO_6$, $H_2O$ obtained in Example 3.

Figure 1:
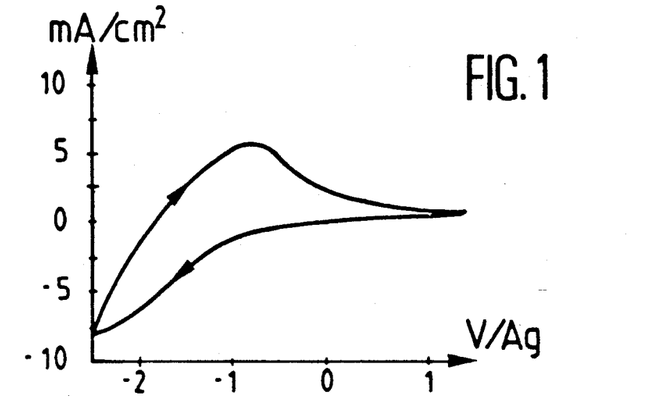
FIGS. 1 to 6, cyclic voltametric curves obtained with layers having a single oxyhydroxide according to the invention.
Figures 2, 3, 4:
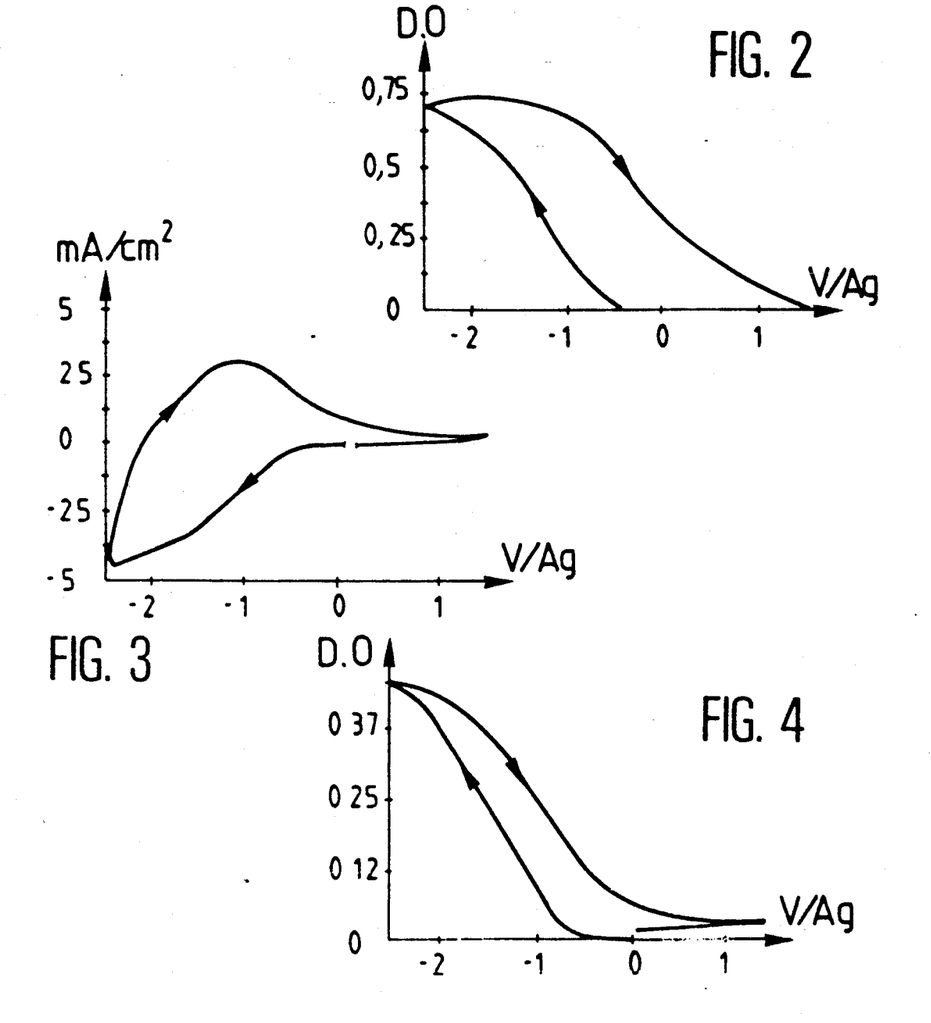

FIGS. 1 and 2 are cyclic voltammetric curves obtained in said cell with a scanning rate of 0.1 V/s.

FIG. 1 is the voltammetric curve, i.e. the intensity variation (in $mA/cm^2$) as a function of the potential applied to the electrode (in V/Ag).

FIG. 2 represents the optical density (O.D.) of the film as a function of the voltage applied to the electrode (in V/Ag). The optical density measurements were carried out in monochromatic light at 632.8 nm.

It can be seen that the reaction is reversible.

EXAMPLE 5

Preparation of a transparent film by evaporation of $H_2Ti_3O_7$

As in Example 3, preparation takes place of a transparent film by vacuum evaporation of $H_2Ti_3O_7$ on a transparent $SnO_2$ electrode. The properties of this electrode are tested in an electrochromic cell having the same electrolyte, the same counterelectrode and the same reference electrode as the cell used in Example 4. The results obtained are shown in FIGS. 3 and 4.

FIG. 3 is the voltammetric curve, i.e. the intensity variation (in $mA/cm^2$) traversing the cell as a function of the potential applied to the electrode (in V/Ag). The voltage scanning rate is 0.1 V/s.

FIG. 4 represents the optical density of the electrode as a function of the potential (in V/Ag).

The curves show that the optical and electrical reversibility is obtained during a cycle. It can also be seen that the hysteresis is very low during the coloring—decoloring passage of $H_2Ti_3O_7$.

EXAMPLE 6

As in Example 5, an electrode for an electrochromic cell is prepared having a $SnO_2$ plate covered by vacuum evaporation of $H_2Ti_3O_7$ and the properties of said electrode are tested in an electrochromic cell with three electrodes having as the electrolyte 0.1N sulphuric acid, a platinum counterelectrode and a $K_2SO_4$-saturated mercurous sulphate reference electrode (ESS). The voltammetric curves are produced with a voltage scanning rate of 0.1 V/s and limit voltages of $-1$ and $+1$ V compared with the reference electrode.

Figure 5:
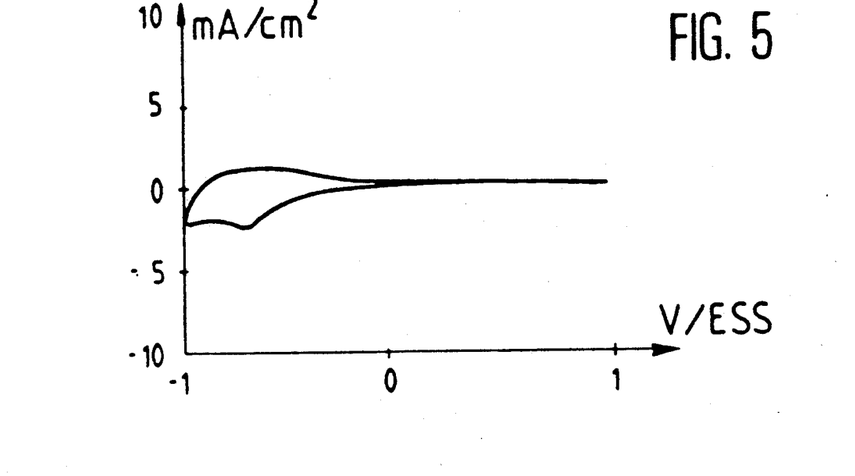
Figure 6:
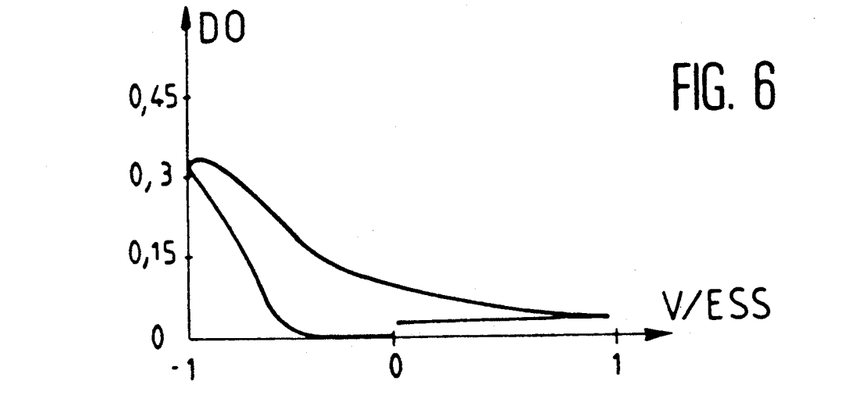

FIGS. 5 and 6 illustrate the results obtained. FIG. 5 is the voltammetric curve I (in $mA/cm^2$) as a function of V (in V/ESS). FIG. 6 is the optical density curve (O.D.) as a function of the potential (in V/ESS). As previously, the reaction is reversible.

EXAMPLE 7

In this example preparation takes place from a mixture of 80 molar % of $H_2Ti_3O_7$ obtained in Example 2 and 20 molar % of $HNbWO_6, H_2O$ obtained in Example 1.

This coating is formed by co-evaporation of two metallic oxyhydroxides under the same conditions as in Example 3 using as the substrate a $SnO_2$-covered glass, as in Example 3.

Figure 7:
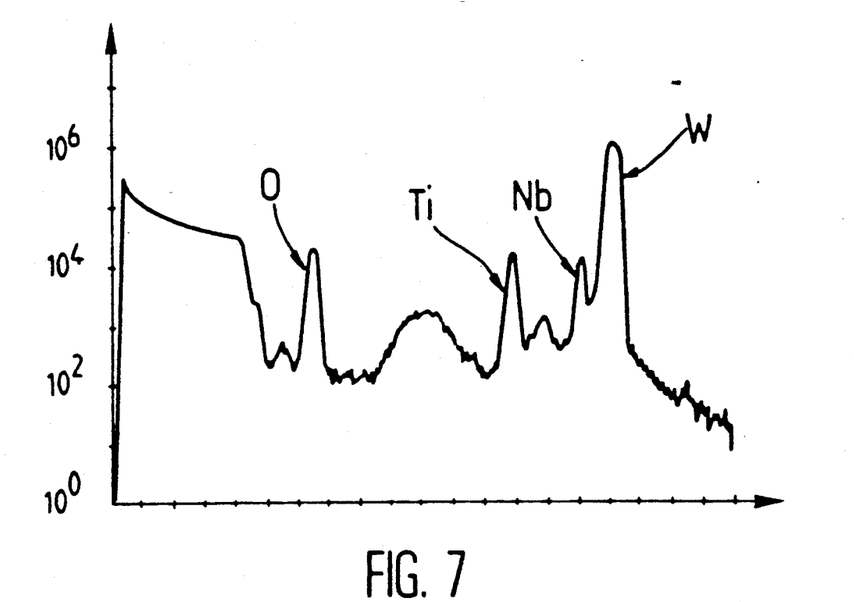
FIG. 7, a Rutherford spectrogram of a layer obtained by vacuum evaporation of a mixture of oxyhydroxides of transition metals according to the invention.

The precise composition of the deposited film was determined by elastic backscattering of $\alpha$ particles (Rutherford spectrometry). The result obtained is shown in FIG. 7. FIG. 7 shows the Rutherford spectrogram obtained and it is possible to see that the main constituents of the film are oxygen, titanium, niobium and tungsten. This amorphous film has a substoichiometric composition corresponding to the formula $Nb_1W_{21}Ti_5O_{73}$.

Figure 8:
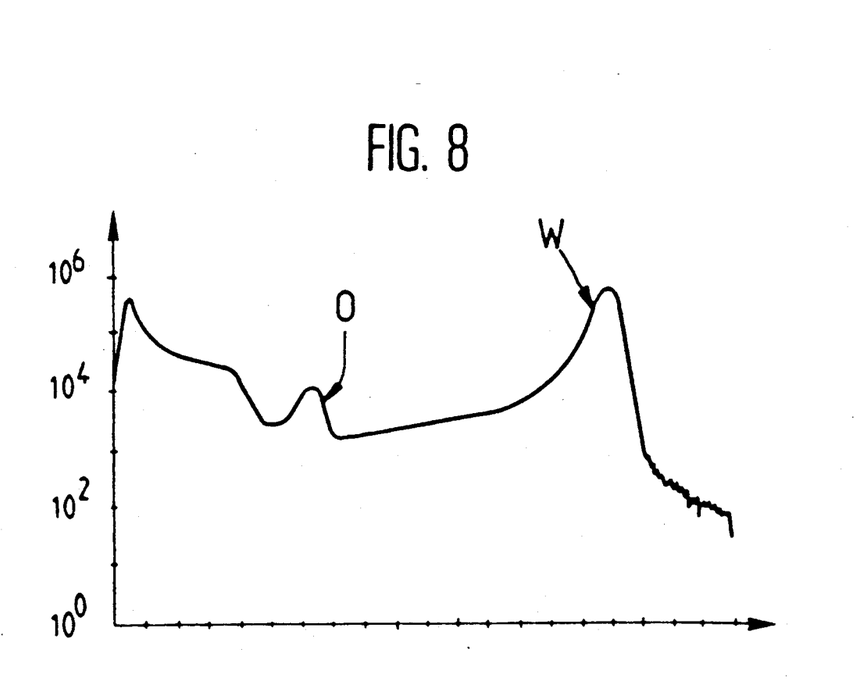
FIG. 8, a Rutherford spectrogram of a layer obtained by co-evaporation of $WO_3$ and $TiO_2$.

For comparison, FIG. 8 is the Rutherford spectrogram obtained with a film obtained by co-evaporation of the corresponding stable oxides $WO_3$ and $TiO_2$. As can be seen, the film obtained does not have the same composition because, in this case, it is a substoichiometric film of tungsten oxide only.

EXAMPLE 8

In this example preparation takes place, as in Example 7, of an amorphous electrochromic material film by the vacuum evaporation of a mixture of 50 molar % $H_2Ti_3O_7$ and 50 molar % $HNbWO_6, H_2O$.

The composition of the material forming the film, determined by elastic backscattering of $\alpha$ particles, as in Example 7, corresponds to the formula: $Nb_{1.6}W_{23}Ti_{1.4}O_{74}$.

EXAMPLE 9

This example makes use of the electrochromic material film obtained in Example 8 as the electrode in an electrochromic cell having three electrodes incorporating an electrolyte constituted by 0.01N $H_2SO_4$, a platinum counterelectrode and a potassium chloride-saturated mercurous chloride reference electrode (ECS).

Figure 9:
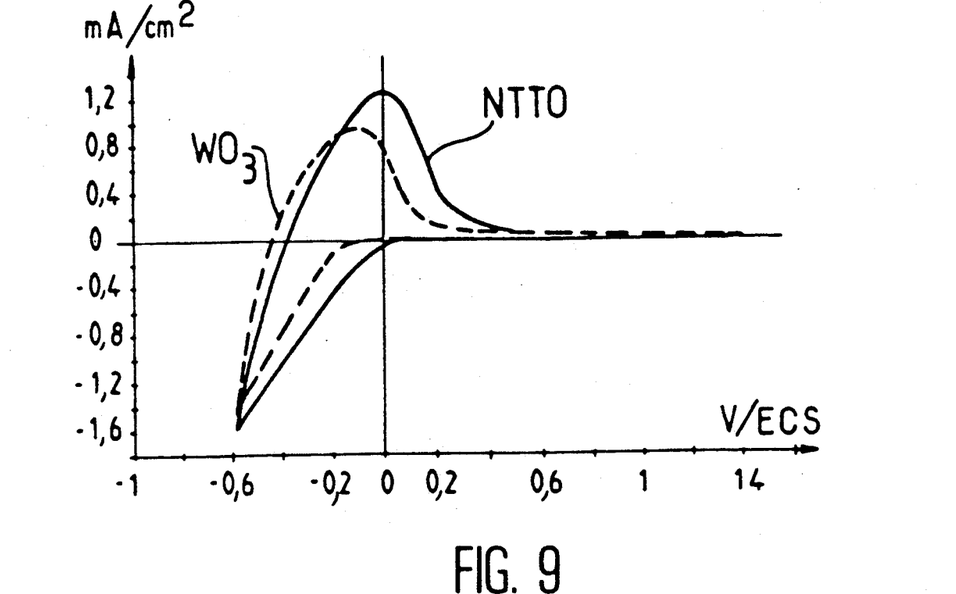
FIG. 9, a voltammetric curve representing the intensity (in $mA/cm^2$) as a function of the potential (in V/ECS) of an electrochromic cell with three electrodes using as the electrochromic material a mixture according to the invention (NTTO) or $WO_3$, a platinum counterelectrode, a saturated calomel reference electrode (ECS) and a liquid electrolyte ($10^{-2}N$ $H_2SO_4$).

FIG. 9 represents the voltammetric curves obtained in this cell with either the electrochromic electrode of Example 8 NTTO (in continuous line form) or a $WO_3$ electrode for comparison purposes (in dotted line form). It can be seen that the coloring of the NTTO film according to the invention commences at a lower potential than the coloring of $WO_3$, which is of particular interest, because this makes it possible to avoid the giving off of hydrogen in the acid medium.

Figure 10:
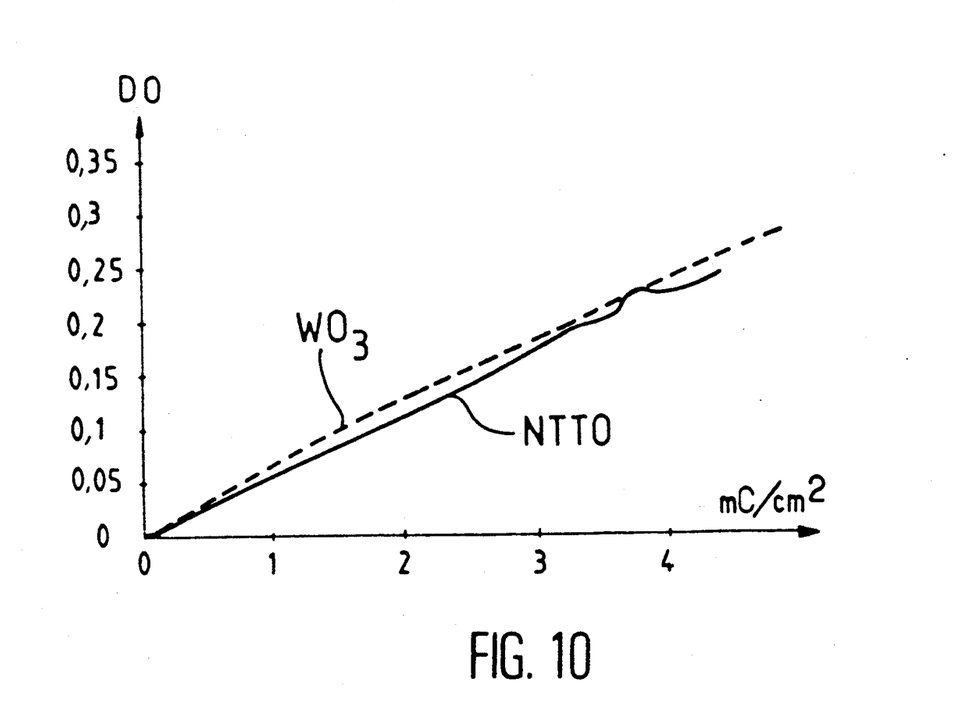
FIG. 10, a diagram illustrating the coloring efficiency, optical density as a function of the electricity quantity Q (in $mC/cm^2$) of an electrochromic material according to the invention (NTTO) compared with the known electrochromic material ($WO_3$).

FIG. 10 represents the curves as a function of the electricity quantity (in $mC/cm^2$) of the film according to the invention and a $WO_3$ film. It can be seen that the coloring efficiencies or yields of these two electrochromic materials (or the gradients of the curves) are similar.

EXAMPLE 10

This example tests the properties of the electrochromic film obtained in Example 8 using it as the electrode in an electrochromic cell having two electrodes and incorporating a solid electrolyte based on ethylene polyoxide and phosphoric acid, as well as a polished stainless steel counterelectrode. The same tests are performed with a $WO_3$ electrochromic film under the same conditions. The results obtained are shown in FIGS. 11 and 12.

Figure 11:
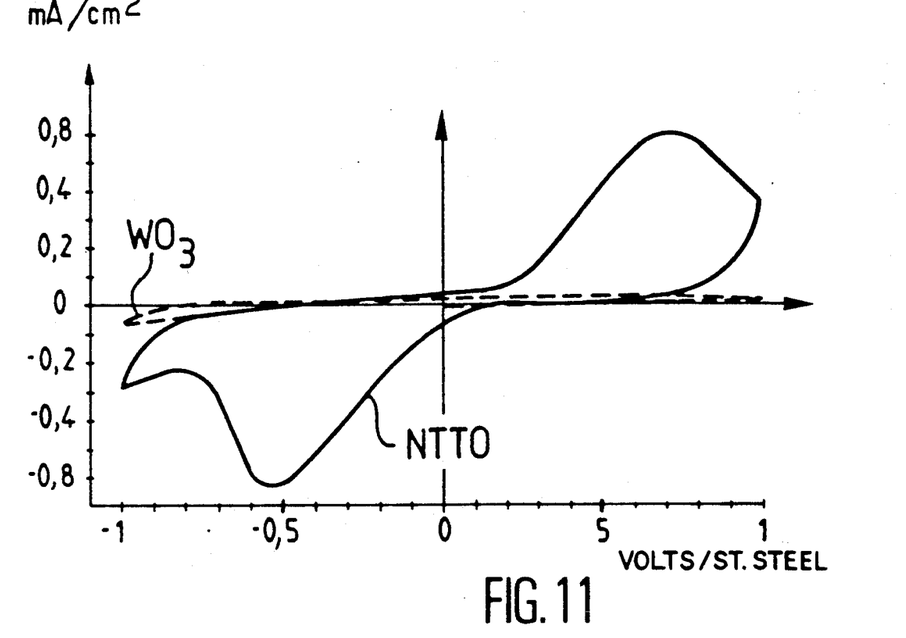
FIG. 11, a voltammetric curve representing the intensity (in $mA/cm^2$) as a function of the potential (in V/stainless steel) of an electrochromic cell having two electrodes using as the electrochromic material an inventive mixture (NTTO) or $WO_3$, a polished stainless steel counterelectrode and a solid electrolyte based on ethylene polyoxide and phosphoric acid.

FIG. 11 is the voltammetric curve representing the intensity (in $mA/cm^2$) as a function of the potential (in V/stainless steel). It can be seen that the electrocoloring ranges of the inventive NTTO film (continuous line) and the $WO_3$ film (dotted line) are very different. It can also be seen that the start of coloring of the inventive film takes place at a lower potential than that of the $WO_3$ film.

Figure 12:
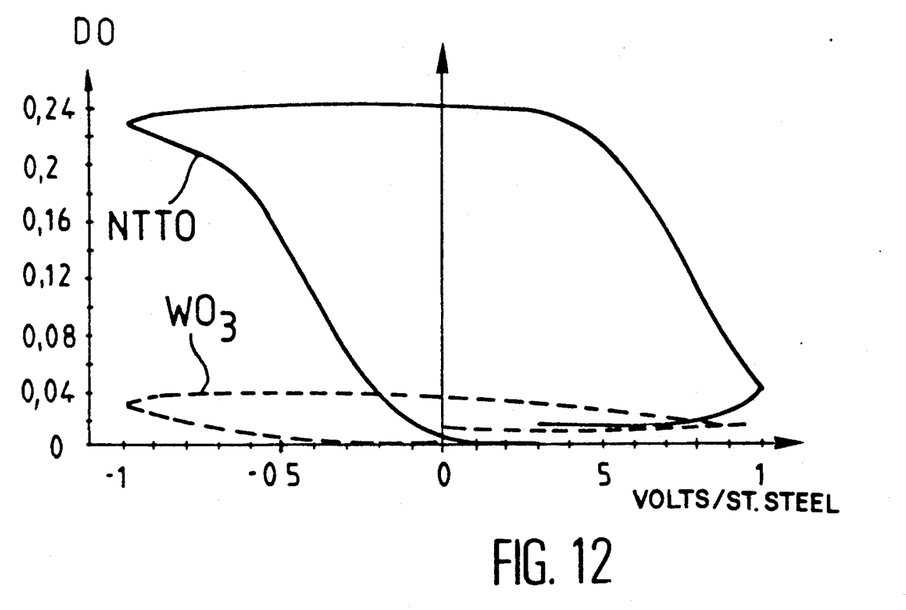
FIG. 12, a diagram representing the optical density of the electrochromic material of FIG. 11 as a function of the potential (in V/stainless steel).

FIG. 12 represents the optical density (O.D.) of the film as a function of the potential applied (in V/stainless steel) for the NTTO film according to the invention and for the $WO_3$ film. It is readily apparent from FIG. 12 that better results are obtained with the film according to the invention.

EXAMPLE 11

This example tests the properties of the electrochromic film obtained in Example 8 using it as the electrode in an electrochromic cell having two electrodes and incorporating a solid electrolyte based on polyethylene imine and $H_3PO_4$ and a polished stainless steel counterelectrode. The results obtained are given in FIGS. 13 and 14.

Figure 13:
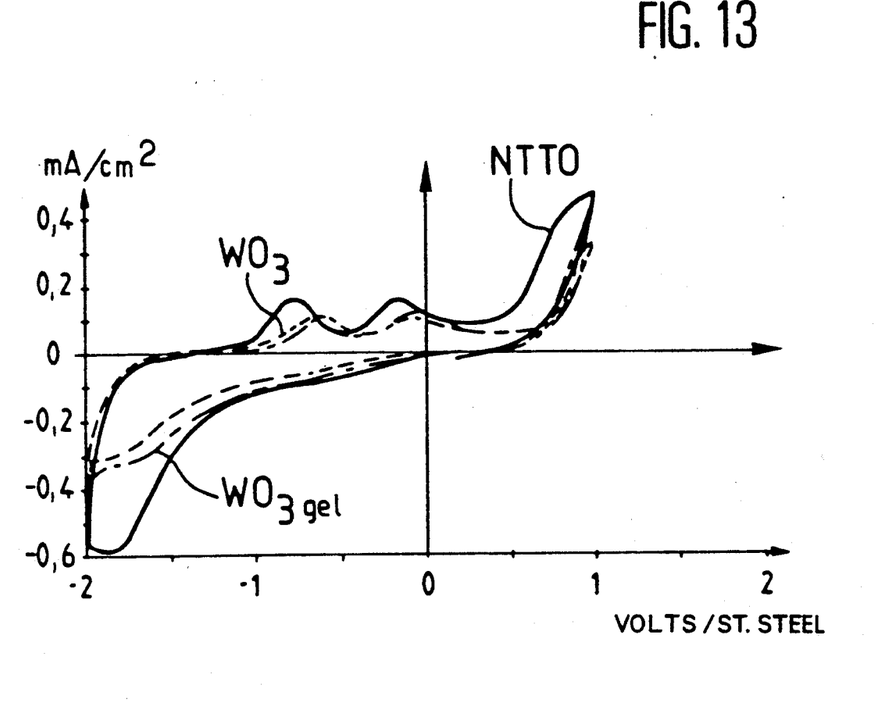
FIG. 13, a voltammetric curve representing the intensity (in $mA/cm^2$) as a function of the potential (in V/stainless steel) of an electrochromic cell having two electrodes and using as the electrochromic material either a mixture according to the invention (NTTO), or evaporated $WO_3$, or a $WO_3$ gel, as the counterelectrode a polished stainless steel plate and a solid electrolyte based on polyethylene imine and phosphoric acid.

FIG. 13 represents the voltammetric curves obtained under the same conditions with the NTTO film according to the invention (continuous line) and an evaporated $WO_3$ film (in dotted lines) and a $WO_3$ gel film (in mixed lines). It can be seen that the electrocoloring ranges are different.

Figure 14:
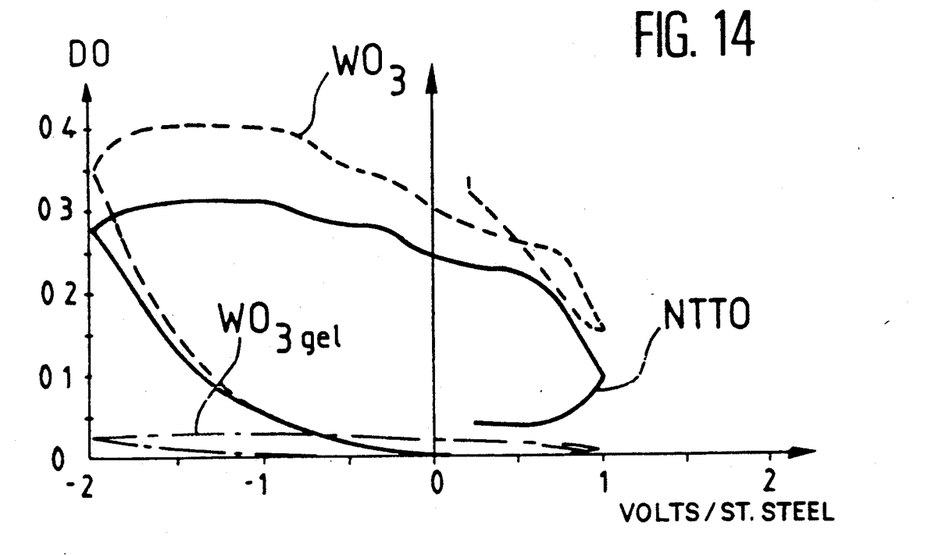
FIG. 14, a curve representing the optical density of the electrochromic materials of FIG. 13 as a function of the potential of the electrode (in V/stainless steel).

FIG. 14 represents the optical density (O.D.) as a function of the potential (in V/stainless steel) for the three different electrochromic electrodes used.

Thus, the electrochromic materials according to the invention have advantages compared with the known and in particular $WO_3$ electrochromic films, namely a less cathodic start of coloring or a more restricted electrocoloring range, which makes it possible to avoid the giving off of hydrogen in the acid medium. In addition, these materials are more stable in a corrosive medium due to their preparation procedure. Basically the first findings would appear to indicate either that there is a very rapid diffusion into the material, or that it is a surface phenomenon. Finally, these materials have a greater reflecting power than that of $WO_3$. The latter property is very important in an application to a glazing, because it avoids the heating of the material during absorption. The electrochromic materials according to the invention have numerous applications, particularly in electrochromic cells and in modulatable optical density screens.

Figure 15:
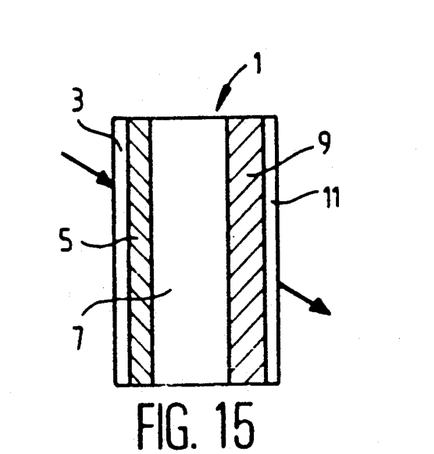
FIGS. 15 and 16, diagrammatic representations of an electrochromic cell using the electrochromic materials according to the invention.
Figure 16:
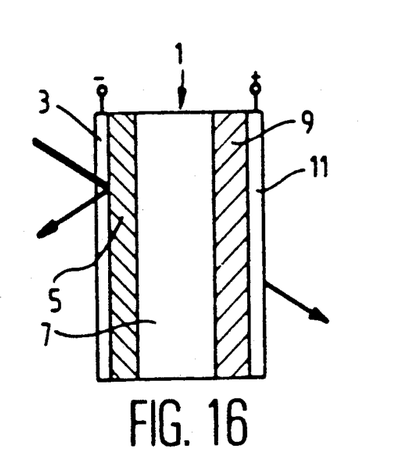

FIGS. 15 and 16 show such a screen. This screen comprises an electrically insulating, transparent container (1) within which are successively arranged a transparent conductor (3), an electrochromic material film (5), a solid or liquid electrolyte (7), a counterelectrode (9) and a current conductor (11), whereby the conductors (3) and (11) can be connected to a not shown electric power supply. Thus, on applying an adequate potential difference between the conductors 3 and 11, the electrochromic material which was transparent in FIG. 15 becomes reflecting or opaque, as can be seen in FIG. 16 and the light rays, e.g. the high energy sun rays HES, which could traverse the panel in the absence of potential, as indicated by the arrows in FIG. 15, are reflected or absorbed in the manner indicated by the arrows in FIG. 16.

In a cell of this type, it is possible to use a counterelectrode made from different materials. Preference is given to the use of transparent materials such as tin oxides, indium oxides, vanadium oxides and iridium oxide and in particular mixed indium and tin oxide electrodes (ITO).

The electrolytes used can be liquid or solid electrolytes. Examples of a liquid electrolyte are sulphuric acid in an aqueous solution, or in a water-glycerol mixture and lithium perchlorate, preferably in an organic solvent such as propylene carbonate or ethylene glycol.

The solid electrolytes can be formed from anhydrous polymers, e.g. complexes of polyethylene oxide and phosphoric acid, polyvinyl pyrrolidone and phosphoric acid, polyethylene imine and phosphoric acid, polydioxolane and $Li(CF_3SO_2)_2N$ and polyethylene oxide and $Li(CF_3SO_2)_2N$.

It is also possible to use polymer complexes such as polyethylene oxide and lithium salts such as $LiClO_4$, $LiCF_3SO_3$.

Solid electrolytes of this type have in particular been described by Daniel Deroo "Electrochromic Windows and Displays Using Polymer Electrolytes" at the second Symposium on Polymer Electrolytes, Jun. 14–16 1989, Siena, Italy and by Jean-Claude Lassègues in Journal of Solid State Ionics, 35, 1989, 17.

We claim:

1. In an electrochromic device, an electrochromic material constituted by $H_2Ti_3O_7$ having an orthorhombic ramsdellite-type structure.

2. In an electrochromic device, an electrochromic material film obtained by the vacuum evaporation of at least one material chosen from the group consisting of $H_2Ti_3O_7$ having an orthorhombic ramsdellite-type structure and $HNbWO_6$, $H_2O$.

3. An electrochromic material film obtained by vacuum evaporation of a mixture of 50 molar % of $H_2Ti_3O_7$ and 50 molar % of $HNbWO_6$, $H_2O$.

4. The film according to claim 3, characterized in that its composition in Nb, W, Ti and O, determined by elastic backscattering of $\alpha$ particles corresponds to the formula: $Nb_{1.6}W_{23}Ti_{1.4}O_{74}$.

5. An electrochromic material film obtained by the vacuum evaporation of a mixture of 80 molar % of $H_2Ti_3O_7$ and 20 molar % of $HNbWO_6$, $H_2O$.

6. An electrochromic film according to claim 5, characterized in that its composition in Nb, W, Ti and O, determined by elastic backscattering of $\alpha$ particles corresponds to the formula: $Nb_1W_{21}Ti_5O_{73}$.

7. A titanium oxyhydroxide of formula: $H_2Ti_3O_7$ having an orthorhombic ramsdellite-type structure.

* * * * *